United States Patent
Linkert et al.

(10) Patent No.: US 8,000,683 B2
(45) Date of Patent: Aug. 16, 2011

(54) SYSTEM AND METHOD FOR COMMUNICATION RECORD LOGGING

(75) Inventors: Barry Linkert, Petersburg (CA); Michael T. Hardy, Waterloo (CA); Piotr K. Tysowski, Waterloo (CA); Galang Vuong, Kitchener (CA); Andrew Bocking, Waterloo (CA)

(73) Assignee: Research in Motion Limited, Waterloo, ON (CA)

( * ) Notice: Subject to any disclaimer, the term of this patent is extended or adjusted under 35 U.S.C. 154(b) by 467 days.

(21) Appl. No.: 11/551,126

(22) Filed: Oct. 19, 2006

(65) Prior Publication Data

US 2007/0111704 A1    May 17, 2007

Related U.S. Application Data

(60) Provisional application No. 60/737,391, filed on Nov. 17, 2005.

(51) Int. Cl.
*H04M 1/725* (2006.01)

(52) U.S. Cl. .............. 455/412.1; 455/413; 455/414.1; 455/414.2; 455/412.2

(58) Field of Classification Search .............. 455/412.1, 455/403, 422.1, 405–410, 414.1–417; 379/114.01–114.09, 114.1, 114.11–114.19, 379/114.21–114.28, 115.01, 121.03, 126
See application file for complete search history.

(56) References Cited

U.S. PATENT DOCUMENTS

| | | | |
|---|---|---|---|
| 5,684,990 A | 11/1997 | Boothby | |
| 5,933,478 A | 8/1999 | Ozaki et al. | |
| 5,974,563 A | 10/1999 | Beeler, Jr. | |
| 5,995,554 A | 11/1999 | Lang | |
| 6,061,389 A | 5/2000 | Ushifuji et al. | |
| 6,212,529 B1 | 4/2001 | Boothby et al. | |
| 6,272,545 B1 | 8/2001 | Flanagin et al. | |
| 6,459,360 B1 | 10/2002 | Helferich | |
| 6,493,709 B1 | 12/2002 | Aiken | |
| 6,496,835 B2 | 12/2002 | Liu et al. | |
| 6,662,198 B2 | 12/2003 | Satyanarayanan et al. | |
| 6,705,781 B2 | 3/2004 | Iwazaki | |
| 6,779,022 B1 | 8/2004 | Horstmann et al. | |
| 6,892,221 B2 | 5/2005 | Ricart et al. | |
| 6,925,477 B1 | 8/2005 | Champagne et al. | |
| 6,944,782 B2 | 9/2005 | von Mueller et al. | |
| 6,968,209 B1 | 11/2005 | Ahlgren et al. | |
| 7,031,733 B2 * | 4/2006 | Alminana et al. | ............ 455/466 |
| 7,047,367 B2 | 5/2006 | Nabekura et al. | |

(Continued)

FOREIGN PATENT DOCUMENTS

EP         1522932 A      4/2005

(Continued)

OTHER PUBLICATIONS

European Patent Application No. 06790863.2 Examination Report dated Mar. 31, 2009.

*Primary Examiner* — Wayne Cai (74) *Attorney, Agent, or Firm* — Perry + Currier (57) ABSTRACT

A method for maintaining a log of communications initiated or received at a portable electronic device of a first party. The communications include at least one of short message service (SMS) messages, personal identification number (PIN) messages and cellular telephone calls. The method includes receiving a data record for each of the communications, extracting information from the data record, and storing the information in a log file.

15 Claims, 6 Drawing Sheets

U.S. PATENT DOCUMENTS

| | | |
|---|---|---|
| 7,050,555 B2 * | 5/2006 | Zargham et al. .......... 379/115.01 |
| 7,240,041 B2 | 7/2007 | Martin et al. |
| 7,317,907 B2 | 1/2008 | Linkert et al. |
| 7,320,061 B2 | 1/2008 | Yu et al. |
| 7,337,193 B1 | 2/2008 | Mills et al. |
| 7,444,382 B2 | 10/2008 | Malik |
| 7,536,440 B2 | 5/2009 | Budd et al. |
| 2001/0044805 A1 | 11/2001 | Multer et al. |
| 2002/0065939 A1 | 5/2002 | Liu |
| 2002/0068546 A1 * | 6/2002 | Plush et al. .................... 455/406 |
| 2002/0118476 A1 | 8/2002 | Malone, Sr. |
| 2002/0136197 A1 | 9/2002 | Owen et al. |
| 2003/0032404 A1 * | 2/2003 | Wager et al. ................... 455/406 |
| 2003/0037020 A1 | 2/2003 | Novak et al. |
| 2003/0131025 A1 | 7/2003 | Zondervan et al. |
| 2003/0159136 A1 | 8/2003 | Huang et al. |
| 2003/0224760 A1 | 12/2003 | Day |
| 2004/0010628 A1 | 1/2004 | Gillam et al. |
| 2004/0025072 A1 | 2/2004 | Mau |
| 2004/0082347 A1 | 4/2004 | Alminana et al. |
| 2004/0098556 A1 | 5/2004 | Buxton et al. |
| 2004/0199540 A1 | 10/2004 | Nojima |
| 2004/0203579 A1 * | 10/2004 | Comp ............................ 455/406 |
| 2004/0224672 A1 | 11/2004 | Linkert et al. |
| 2004/0248560 A1 | 12/2004 | Bedingfield et al. |
| 2004/0259531 A1 * | 12/2004 | Wood et al. ................. 455/412.1 |
| 2005/0030229 A1 | 2/2005 | Spiker, Jr. |
| 2005/0075097 A1 | 4/2005 | Lehikoinen et al. |
| 2005/0198084 A1 | 9/2005 | Kim |
| 2005/0213511 A1 * | 9/2005 | Reece et al. ................... 370/252 |
| 2006/0116162 A1 | 6/2006 | Desai et al. |
| 2007/0072588 A1 | 3/2007 | Gorty et al. |
| 2007/0083676 A1 | 4/2007 | Rabbers et al. |
| 2007/0226272 A1 | 9/2007 | Huang et al. |
| 2008/0189425 A1 | 8/2008 | Green |
| 2008/0201668 A1 | 8/2008 | Roy |
| 2009/0042612 A1 | 2/2009 | Moran et al. |
| 2009/0068979 A1 * | 3/2009 | Alston ........................... 455/405 |
| 2009/0075697 A1 | 3/2009 | Wilson et al. |
| 2009/0215478 A1 | 8/2009 | Leinonen et al. |
| 2010/0146133 A1 | 6/2010 | Perrin et al. |
| 2010/0255817 A1 | 10/2010 | Chen et al. |

FOREIGN PATENT DOCUMENTS

| | | |
|---|---|---|
| GB | 2366881 A | 3/2002 |
| JP | 11249980 A | 9/1999 |
| WO | 02061706 A1 | 8/2002 |
| WO | 2005041549 A1 | 5/2005 |
| WO | 2005045649 A1 | 5/2005 |
| WO | 2005057233 A2 | 6/2005 |

* cited by examiner

SYSTEM AND METHOD FOR COMMUNICATION RECORD LOGGING

FIELD

The present application relates generally to electronic devices and more particularly to a system and method for maintaining a log of wireless transactions.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS AND W-CDMA networks.

These portable electronic devices are commonly used for communication, for example, for sending and receiving electronic mail (e-mail), SMS messages (short message service, commonly referred to as text messages) and PIN messages (Personal Identification Number messages). For voice enabled devices such as smart telephones for example, voice communication in the form of telephone calls can be initiated and received at the portable electronic devices.

While copies of some communications are stored, for example, in a backup database for backing up data of the electronic device, there is no method of tracking SMS, PIN or telephone communications sent or received. This presents a problem for those companies or corporations looking to audit communication transactions to or from a portable electronic device. Indeed in some jurisdictions, such audit information is important to meet regulations relating to logging of electronic communications.

Improvements in portable electronic device communication tracking is therefore desirable.

BRIEF DESCRIPTION OF THE DRAWINGS

The system and method for communication record logging will be better understood with reference to the following description and to the Figures, in which.

DETAILED DESCRIPTION OF THE EMBODIMENTS

Figure 1:
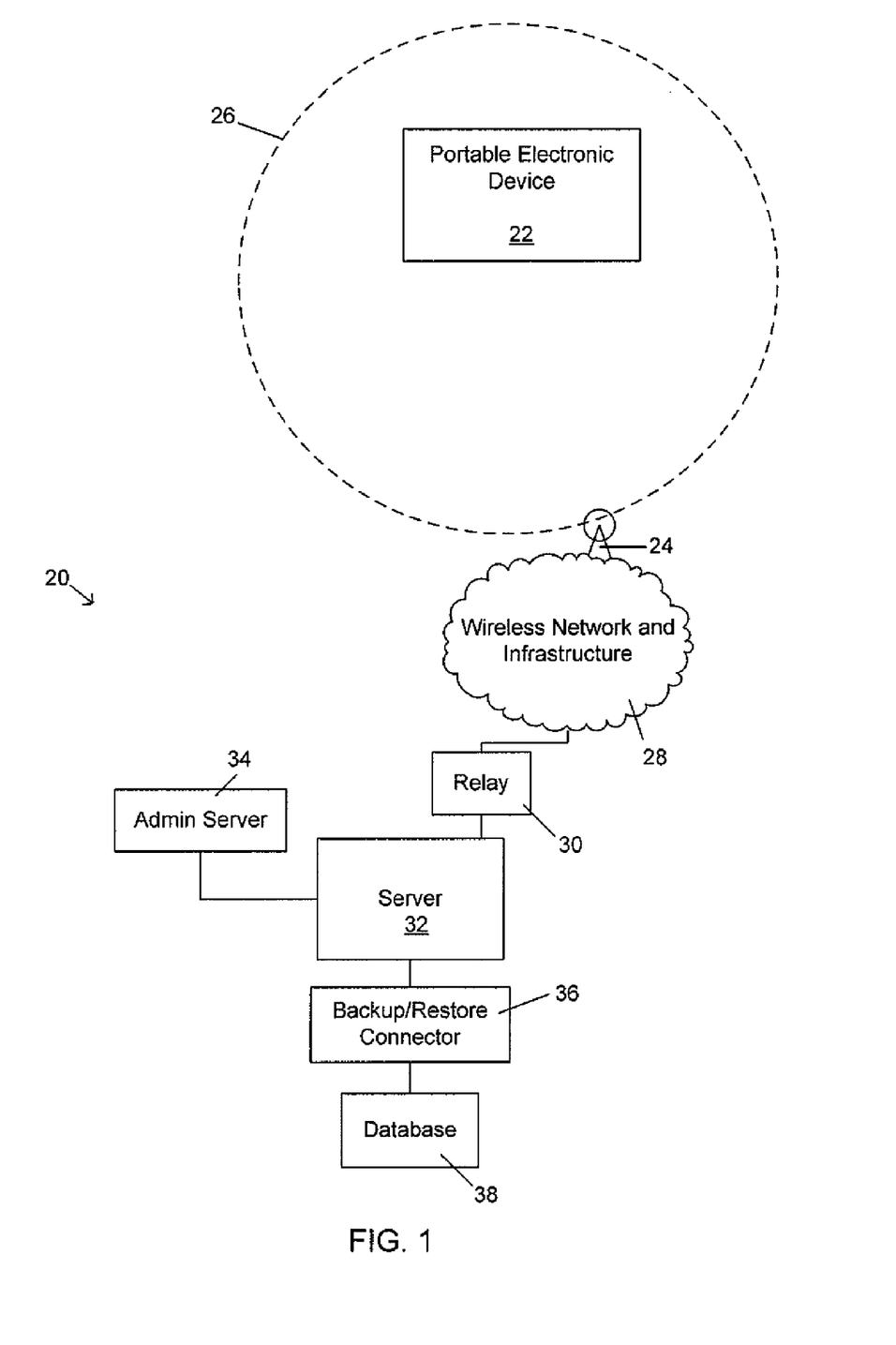
FIG. 1 is a functional block diagram of a communication system and portable electronic device for communication record logging in accordance with one embodiment.

Reference is first made to FIG. 1 which shows a functional block diagram of a communication system indicated generally by the numeral 20 and a portable electronic device 22. The communication system 20 provides for communications with portable electronic devices including the exemplary portable electronic device 22, as shown. The portable electronic device 22 and the communication system 20 are operable to effect communications over a radio communications channel therebetween. Data originating at the portable electronic device 22 is communicated to the communication system 20 by way of the radio communications channel. Similarly, data originating at the communication system 20 is communicated from the communication system 20 to the portable electronic device 22 by way of the radio communications channel, thereby providing data to the portable electronic device 22.

For the purpose of illustration, the communication system 20 is functionally represented in FIG. 1 and a single base station 24 is shown. The base station 24 defines a coverage area, or cell 26 within which communications between the base station 24 and the portable electronic device 22 can be effected. It will be appreciated that the portable electronic device 22 is movable within the cell 26 and can be moved to coverage areas defined by other cells that are not illustrated in the present example. The communication system 20 includes a base station 24 that is part of a wireless network and infrastructure 28 that provides a link to the portable electronic device 22. The wireless network and infrastructure 28 includes a number of base stations (not shown) that provide communications with the other cells referred to above. Data is delivered to the portable electronic device 22 via wireless transmission from the base station 24. Similarly, data is sent from the portable electronic device 22 via wireless transmission to the base station 24.

Wireless networks and infrastructures include, for example, data-centric wireless networks, voice-centric wireless networks, or dual-mode wireless networks. For the purpose of the present exemplary embodiment, the wireless network and infrastructure 28 includes a dual-mode wireless network that supports both voice and data communications over the same physical base stations.

The communication system 20 includes a relay device 30 that is connected to the wireless network and infrastructure 28 and to a server 32. It will be understood that the functions provided by the relay device 30 and the server 32 can be embodied in the same device. The server 32 is also connected to an administration server 34, as shown. The administration server 34 provides administrative services to and control over the server 32.

The server 32 is also functionally coupled through a connector 36 to a backup/restore database 38. Other connectors and databases can be provided, for example, for synchronization purposes. Such connectors and databases are not shown in FIG. 1 for the purpose of simplicity. The connector 36 receives commands from the server 32. It will be understood that the connector 36 is a functional component and can be provided by way of an application on the server 32. The backup/restore database 38 is used for storing data records, including, for example, copies of SMS or PIN messages sent from the portable electronic device 22.

Figure 2:
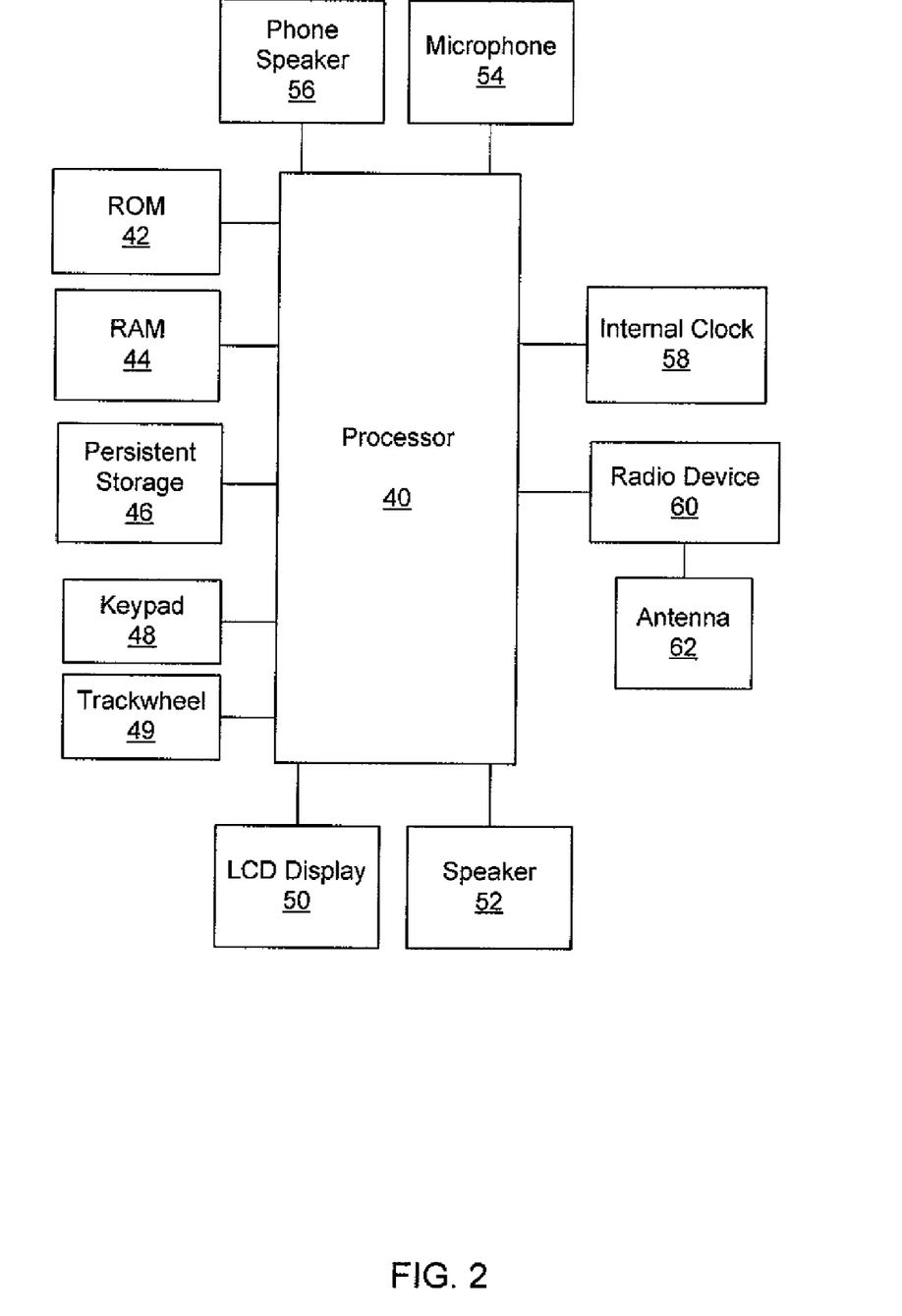
FIG. 2 is a block diagram of certain components of the electronic device of FIG. 1.

Referring now to FIG. 2, a block diagram of certain components within the portable electronic device 22 is shown. In the present embodiment, the portable electronic device 22 is based on the computing environment and functionality of a wireless personal digital assistant. It will be understood, however, that the portable electronic device 22 is not limited to a wireless personal digital assistant. Other portable electronic devices are possible, such as cellular telephones, smart telephones, and laptop computers. Referring again to the present embodiment, the portable electronic device 22 is based on a microcomputer including a processor 40 connected to a read-only-memory (ROM) 42 that contains a plurality of applications executable by the processor 40 that enables the portable electronic device 22 to perform certain functions including, for example, PIN message functions, SMS message functions and cellular telephone functions. The processor 40 is also connected to a random access memory unit (RAM) 44 and a persistent storage device 46 which are responsible for various non-volatile storage functions of the portable electronic device 22. The processor 40 receives input from various input devices including a keypad 48 and a trackwheel 49. The trackwheel can be depressed as a means to provide additional user-input. The microprocessor 40 receives input from the trackwheel which is used for user selection of features from a list or a table on an LCD display 50 of the portable electronic device 22. Selection is carried out by rolling the trackwheel to move a cursor (or highlighted region), for example, to the desired selection and pressing inwardly on the trackwheel. The processor 40 outputs to various output devices including the LCD display 50 and a speaker 52. A microphone 54 and phone speaker 56 are connected to the processor 40 for cellular telephone functions. The processor 40 is also connected to an internal clock 58 and a modem and radio device 60. The modem and radio device 60 is used to connect to wireless networks using an antenna 62. The modem and radio device 60 transmits and receives voice and data communications to and from the portable electronic device 22 through the antenna 62.

The portable electronic device 22 is operable to effect two way communication of voice and data. Thus, the portable electronic device 22 transmits and receives voice communications over the wireless network and infrastructure 28 via wireless communications with the base station 24 over a radio communications channel. Similarly, the portable electronic device 22 transmits and receives data communications over the wireless network and infrastructure 28 via wireless radio communications with the base station 24 over a radio communications channel.

Figure 3:
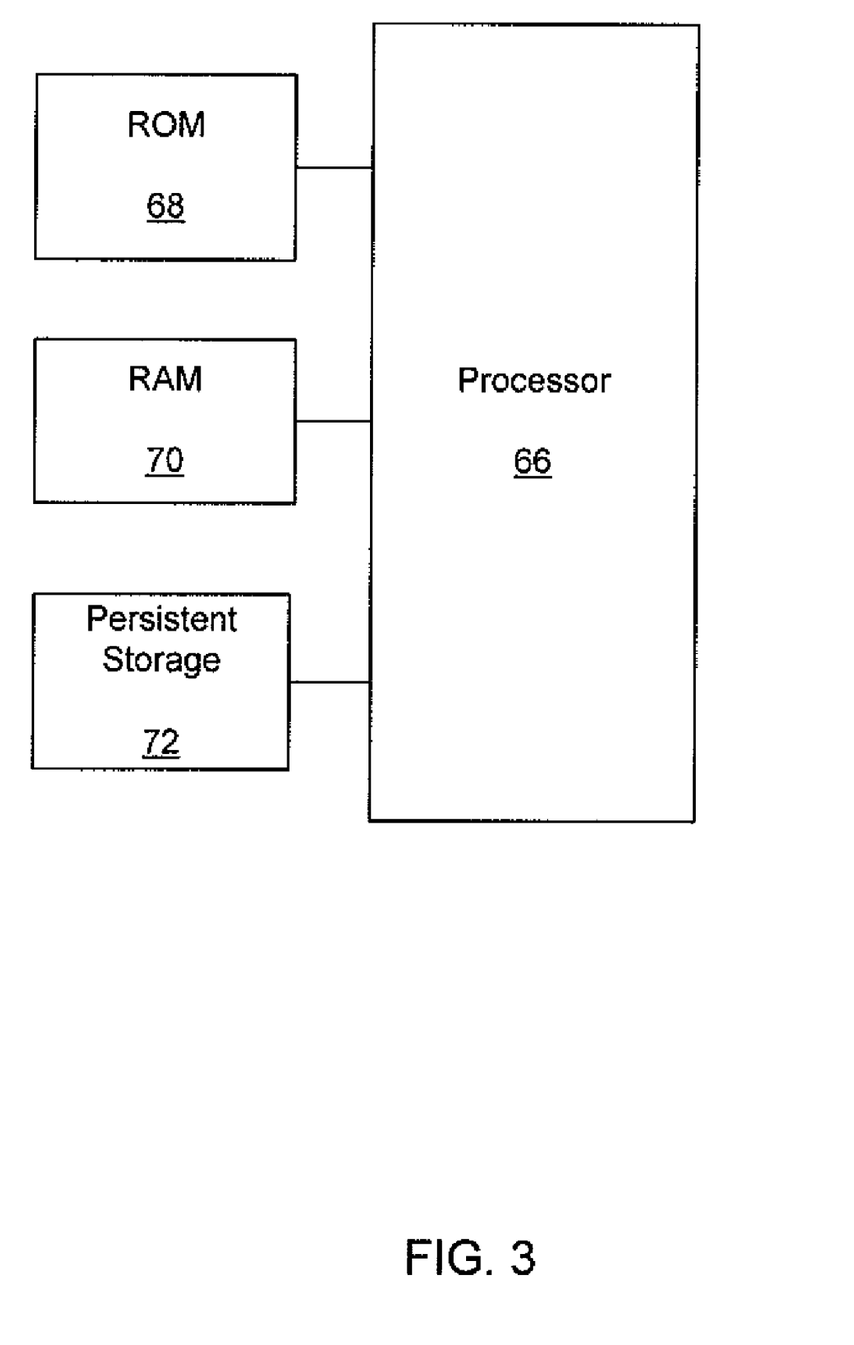
FIG. 3 is a block diagram of certain components within the synchronization server of FIG. 1.

Reference is now made to FIG. 3 which shows a block diagram of certain components within the server 32. Similar to the portable electronic device 22, the server 32 includes a processor 66 connected to a read only memory (ROM) 68 that includes applications executable by the processor 66 and enables the server 32 to perform certain functions including synchronization with the portable electronic device 22. The processor 66 is also connected to a random access memory unit (RAM) 70 and a persistent storage device 72 which are responsible for various non-volatile storage functions of the server 32.

It will be understood that the functions described herein can be carried out in any suitable manner. In the present example, the functions are carried out by algorithms executable by the processor 66. For example, the processor 66 of the server 32 is operable to receive communications generated by the portable electronic device 22 for delivery to other electronic devices. The processor 66 is operable to extract log information from SMS messages, PIN messages and telephone records sent to the server 32. The processor 66 is further operable to retrieve log files from the persistent storage 72 or create new log files if an appropriate log file does not exist on the persistent storage 72. The processor 66 is operable to update the log file using the log information extracted from a message and using additional information determined at the processor 66. The processor 66 is operable to resave the log file to the persistent storage 72 thereby maintaining an audit log of the information extracted.

The portable electronic device 22 is operable to send and receive a variety of different communication types including SMS messages, PIN messages and telephone calls to and from other portable electronic devices (not shown) connected to the wireless network and infrastructure 28.

It will be appreciated that the portable electronic device 22 and server 32 are operable to carry out many other functions, some of which are described below.

Figure 4:
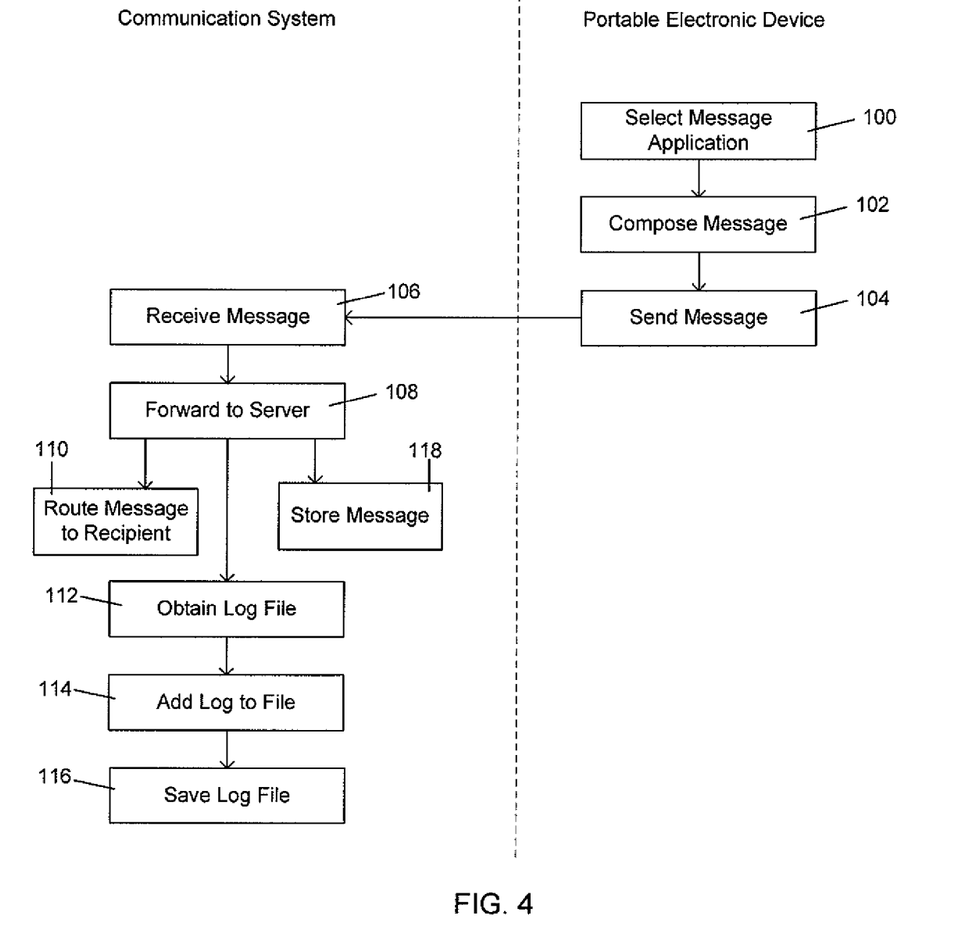
FIG. 4 is a sequence diagram illustrating functions carried out at both the portable electronic device and the communication system of FIG. 1 according to one example of communication record logging of the present application.

Reference is now made to FIG. 4, which shows a sequence diagram illustrating functions carried out at both the portable electronic device 22 and the communication system 20 during sending of communications from the portable electronic device, in accordance with one embodiment of the present application. Coding of software for carrying out the steps illustrated is well within the scope of a person of ordinary skill in the art. In the present example, the message sent is an SMS message. In order to send the SMS message using the portable electronic device 22, the SMS messaging application stored on the ROM 42 is selected using the trackwheel 49 by selection from a number of options displayed on the LCD display 50 (step 100). The SMS message is then composed by entering message text using the keypad 48 (step 102). The destination number is then entered, and the message is sent by selection of a send command using the keypad 48 or trackwheel 49 (step 104). In the present example, the message is an SMS message, and the destination number is the telephone number of the destination portable electronic device (not shown). The SMS message is then sent via a radio communications channel to the base.

The SMS message is received at the base station 24 (step 106) and forwarded through the wireless network and infrastructure 28 and the relay 30 to the server 32 of the communication system 20 (step 108). The message is then routed through the wireless network and infrastructure 28 to the appropriate base station for transmission to the destination portable electronic device (step 110). It will be understood that the message is forwarded to the appropriate base station based on the cell in which the destination portable electronic device is located. The SMS message data includes several fields such as, for example, information regarding the sender (message source), the length of the message, a time stamp, the destination phone number, the format, the body of the message and others. The server 32 extracts log information from individual fields of the message, adds the information to a log file associated with the portable electronic device 22 and stores the log file in the persistent storage 72 of the server 32. In the present example, the log information extracted from fields of the message includes the following: a name identifying the sender of the message (message source); an e-mail address of the sender; the destination phone number; the body of the message; and a time stamp indicating the time the message was sent from the portable electronic device 22. The server 32 also adds log information to the log including: an indication that the message is outgoing; a server log date indicating the date and time the record is logged on the server 32; and a unique identification for the record sent. The SMS log file associated with the portable electronic device 22 is retrieved from the persistent storage 72, or if no SMS log file exists yet, one is created (step 112). The SMS log file that is retrieved or created is date-specific. Thus, the SMS log file that is retrieved is the SMS log file for the date on which the log file is retrieved. If no SMS log file exists for that date, a new SMS log file is created. The log information described above is added to the SMS log (step 114) and the modified (or new) SMS log file is stored in the persistent storage 72 (step 116). It will be appreciated that a new log file is created and stored for each day that an SMS message is sent or received.

In the present embodiment, the date for each log file is embedded in the name of the log file, thereby distinguishing the log files for different dates. In addition to storing the log, a copy of the SMS message is forwarded to the connector 36 and stored in the backup/restore database 38 (step 118).

Figure 5:
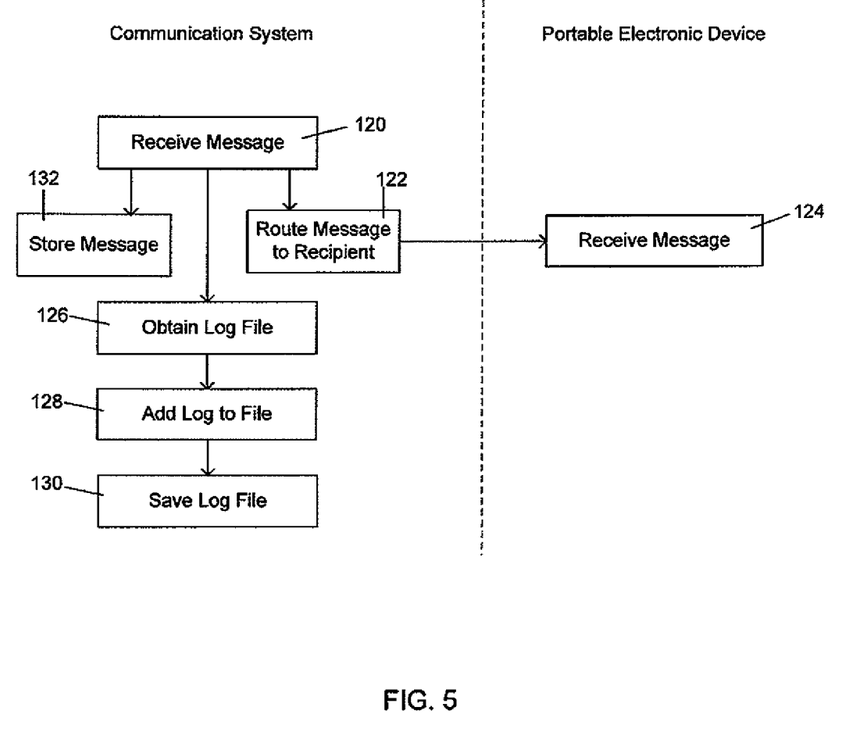
FIG. 5, is a sequence diagram illustrating functions carried out at both the portable electronic device and the communication system of FIG. 1 according to another example of communication record logging of the present application.

Reference is now made to FIG. 5, which shows a sequence diagram illustrating functions carried out at both the portable electronic device 22 and the communication system 20 during receiving of communications at the portable electronic device 22. Again, coding of software for carrying out the steps illustrated is well within the scope of a person of ordinary skill in the art. In the present example, the message received is an SMS message. The SMS message is composed and sent from another portable electronic device (not shown) connected to the wireless network and infrastructure 28. The SMS message is received at a base station and forwarded through the wireless network and infrastructure 28 and the relay 30 to the server 32 of the communication system 20 (step 120). The message is then routed through the wireless network and infrastructure 28 to the base station 24 and transmitted to the portable electronic device 22 via a radio communication channel (step 122). It will be understood that the message is forwarded to the base station 24 covering the cell in which the portable electronic 22 device is located.

The SMS message is received at the portable electronic device 22 (step 124). In the present example, the portable electronic device emits a notification such as an SMS specific ring tone through the speaker 52, thereby notifying the user of receipt of an SMS message at the portable electronic device 22. The user can, of course, view the SMS message in the SMS messaging application, using the LCD display 50.

Again, the SMS message data includes several fields such as, for example, information regarding the sender (message source), the length of the message, a time stamp, the destination phone number, the format, the body of the message and others. The server 32 extracts log information from individual fields of the message, adds the information to the SMS log file associated with the portable electronic device 22 and stores the SMS log file in the persistent storage 72 of the server 32. In the present example, the log information extracted from fields of the message includes the following: a name identifying the sender of the message (message source); an e-mail address of the sender; the source phone number; the body of the message; and a time stamp indicating the time the message was sent from the source portable electronic device. The server 32 again adds log information to the log including an indication that the message is incoming; a server log date indicating the date and time the record is logged on the server 32; and a unique identification for the record received. The SMS log file associated with the portable electronic device 22 is retrieved from the persistent storage 72 (step 126). The log information is added to the SMS log (step 128) and the modified SMS log file is stored in the persistent storage 72 (step 130). In addition to storing the log file, a copy of the SMS message is forwarded to the connector 36 and stored in the backup/restore database 38 (step 132).

Reference is again made to FIG. 4 to describe another example in which a PIN message is sent from the portable electronic device 22. It will be appreciated that the present example is similar to the example described above in relation to sending an SMS message. In order to send the PIN message using the portable electronic device 22, the PIN messaging application stored on the ROM 42 is selected using the trackwheel 49 by selection from a number of options displayed on the LCD display 50 (step 100). The PIN message is then composed by entering message text using the keypad 48 (step 102). The destination number is then entered and the message is sent by selection of a send command using the trackwheel 49 (step 104). In the present example, the message is a PIN message, and the destination number that is entered is therefore a personal identification number (PIN) associated with the destination portable electronic device (not shown). It will be appreciated that to send a PIN message, the PIN number of the destination portable electronic device must be known. The PIN message is then sent via a radio communications channel to the base station 24 (for the cell in which the portable electronic device 22 is located).

The PIN message is received at the base station 24 (step 106) and forwarded through the wireless network and infrastructure 28 and the relay 30 to the server 32 of the communication system 20 (step 108). The message is then routed through the wireless network and infrastructure 28, to the appropriate base station for transmission to the destination portable electronic device (step 110). It will be understood that the message is forwarded to the appropriate base station based on the cell in which the destination portable electronic device identified by the PIN number, is located. The PIN message data includes several fields such as, for example, information regarding the sender (message source), the length of the message, a time stamp, the destination PIN numbers including any additional PIN numbers that are copied by CC (carbon copy) or BCC (blind carbon copy), the subject of the message, the body of the message and others. The server 32 extracts log information from individual fields of the PIN message, adds the information to a PIN message log file associated with the portable electronic device 22 and stores the PIN message log file in the persistent storage 72 of the server 32. In the present example, the log information extracted from fields of the PIN message includes the following: a name identifying the sender of the message (message source); a PIN number of the sender; the e-mail address of the sender; the destination PIN numbers, including any additional PIN numbers that are copied by CC (carbon copy) or BCC (blind carbon copy); the subject of the message; the body of the message; and a the time stamp indicating the time the message was sent from the portable electronic device 22. The server 32 also adds log information to the log including: an indication that the message is outgoing; a server log date indicating the date and time the record is logged on the server 32; and a unique identification for the record sent. The PIN log file associated with the portable electronic device 22 is retrieved from the persistent storage 72, or if no PIN log file exists, one is created (step 112). Similarly to the SMS log file, the PIN log file that is retrieved or created is date specific. Thus, the PIN log file that is retrieved is the PIN log file for the date on which the log file is retrieved. If no PIN log file exists for that date, a new PIN log file is created. The PIN log information described above is added to the PIN log (step 114) and the modified (or new) PIN log file is stored in the persistent storage 72 (step 116). In addition to storing the log, a copy of the PIN message is forwarded to the connector 36 and stored in the backup/restore database 38 (step 118).

Reference is again made to FIG. 5 to describe an example in which a PIN message is received at the portable electronic device 22. Again the present example is similar to the example described above in relation to receipt of an SMS message. The PIN message is composed and sent from another portable electronic device (not shown) connected to the wireless network and infrastructure 28, using the PIN number of the portable electronic device 22. The PIN message is received at a base station and forwarded through the wireless network and infrastructure 28 and the relay 30 to the server 32 of the communication system 20 (step 120). The PIN message is then routed through the wireless network and infrastructure 28 to the base station 24 and transmitted to the portable electronic device 22 via a radio communication channel (step 122). It will be understood that the PIN message is forwarded to the base station 24 covering the cell in which the portable electronic 22 device is located.

The PIN message is received at the portable electronic device 22 (step 124). In the present example, the portable electronic device emits a notification such as a PIN message specific ring tone through the speaker 52, thereby notifying the user of receipt of a PIN message at the portable electronic device 22. The user can, of course, view the PIN message in the PIN messaging application, using the LCD display 50.

Again, the PIN message data includes several fields such as, for example, information regarding the sender (message source), the length of the message, a time stamp, the destination PIN number, the subject of the message, the body of the message and others. The server 32 extracts log information from individual fields of the PIN message, adds the information to the PIN log file associated with the portable electronic device 22 and stores the PIN log file in the persistent storage 72 of the server 32. In the present example, the log information extracted from fields of the message include the following: a name and PIN number identifying the sender of the PIN message (message source); an e-mail address of the sender; the PIN number of the receiving portable electronic device 22; the body of the message; and a the time stamp indicating the time the message was sent from the source portable electronic device. The server 32 again adds log information to the PIN log including: an indication that the message is incoming; a server log date indicating the date and time the record is logged on the server 32; and a unique identification for the record received. The PIN log file associated with the portable electronic device 22 is retrieved from the persistent storage 72 (step 126). The PIN log information is added to the PIN log (step 128), and the modified PIN log file is stored in the persistent storage 72 (step 130). In addition to storing the PIN log file, a copy of the PIN message is forwarded to the connector 36 and stored in the backup/restore database 38 (step 132).

It will now be understood that new PIN and new SMS messages sent and received are logged in the respective log file stored on the persistent storage 72. Each update and replacement of those messages, for example when a reply is sent or received, is also stored as a separate instance in the respective log file in a similar manner to that described above. Thus, each SMS log file includes a complete log of SMS message activity for the portable electronic device 22 for the date of the log file. Similarly, each PIN log file includes a complete log of PIN message activity for the portable electronic device 22 for the date of the log file.

Figure 6:
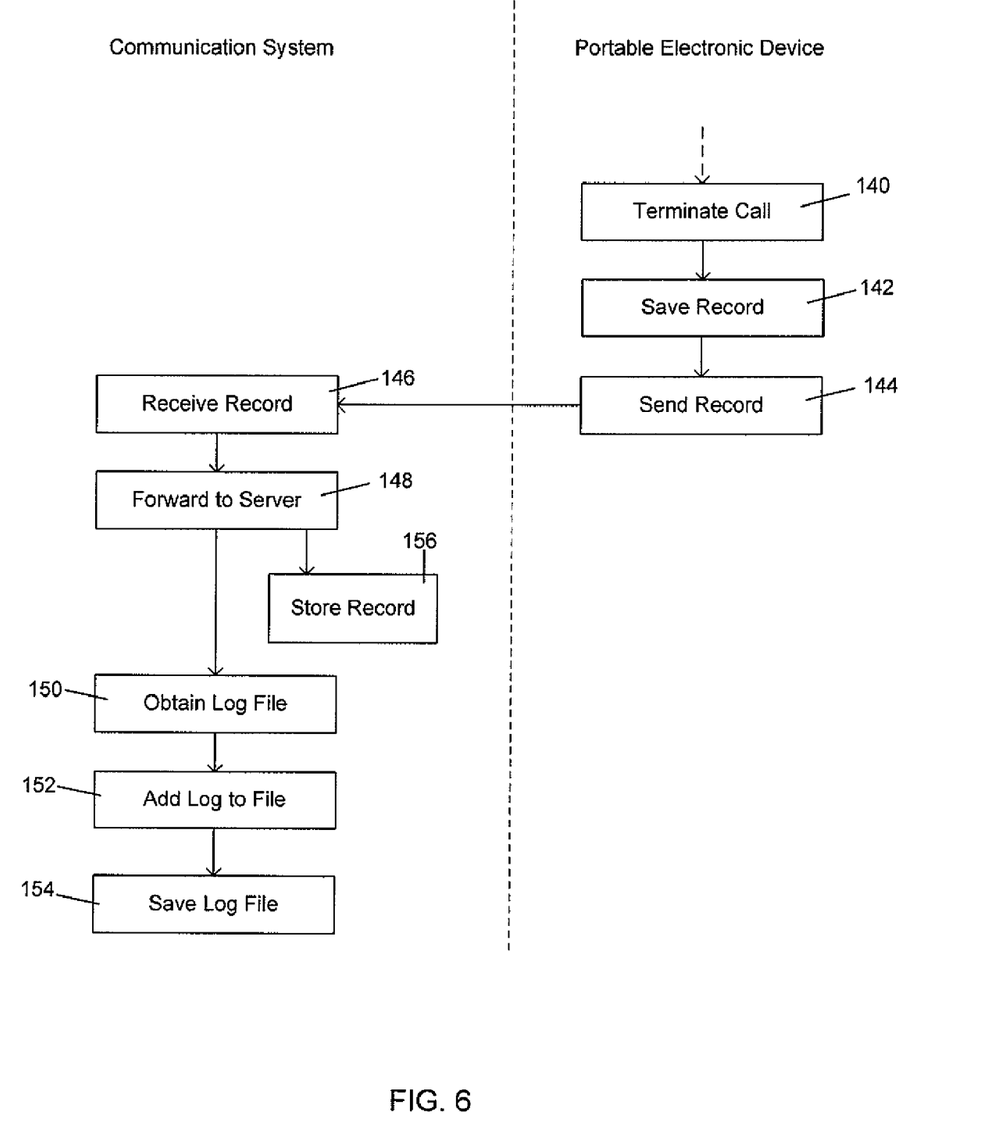
FIG. 6 is a sequence diagram illustrating functions carried out at both the portable electronic device and the communication system of FIG. 1 according to still another example of communication record logging of the present application.

Reference is now made to FIG. 6 to describe another example in which a cell phone call is made from the portable electronic device 22. Again, coding of software for carrying out the steps illustrated is well within the scope of a person of ordinary skill in the art. In order to place a cell phone call using the portable electronic device 22, the cell phone application stored on the ROM 42 is selected using the trackwheel 49 by selection from a number of options displayed on the LCD display 50. The destination number is then entered and the call is initiated by selection of a send command using the keypad 48 or trackwheel 49. The destination information (phone number) is then sent via a radio communications channel to the base station 24 (for the cell in which the portable electronic device 22 is located).

The wireless network and infrastructure 28 then notifies the recipient at the destination phone number, as will be understood by one skilled in the art. For example, if the destination phone number is a cell phone, the base station in which that cell phone is located sends a notification causing the destination cell phone to ring. The connection is then completed if the recipient answers the phone, allowing voice communication with the user of the portable electronic device 22 from which the call originated.

The user terminates the phone call by selecting a hang-up option either after voice communication, after recording a voice-mail message or after the call is not answered (step 140). The portable electronic device 22 maintains a record of the phone call made. The record includes information such as the type of call (outgoing), the name and phone number of the person called, the time at which the call was initiated and the elapsed time of the call when the caller hung up. This information is stored in a database on the persistent storage device 46 of the portable electronic device 22 (step 142). With this information change (addition) to the database on the persistent storage device 46, the call information from the call record is then sent to the communication system 20 via a radio communication channel (step 144).

The call record is received at the base station 24 (step 146) and forwarded through the wireless network and infrastructure 28 to the relay 30 and server 32 (step 148). The server 32 receives the call record and extracts the information for addition to a phone log file in the persistent storage 72 of the server 32. In the present example, the server 32 extracts log information from the record, including the identification of the caller (name and phone number), the type of call, the name and phone number of the person called, the time at which the call was initiated and the elapsed time of the call. The server 32 also adds log information including a server log date, indicating the date and time the phone record is logged on the server 32, and a unique identification for the phone log record. The phone log file associated with the portable electronic device 22 is retrieved from the persistent storage 72, or if no phone log file exists, one is created (step 150). The phone log information described above is added to the phone log (step 152) and the modified (or new) phone log file is stored in the persistent storage 72 (step 154). In addition to storing the log, a copy of the phone record is forwarded to the connector 36 and stored in the backup/restore database 38 (step 156).

Referring still to FIG. 6 to describe another example in which cell phone call is received at the portable electronic device 22, a call is indicated at the portable electronic device by, for example, a ring tone emitted from the speaker 52. The phone call can be answered by pressing a key on the keypad 48, for example.

The phone call is terminated either by selecting a hang-up option after voice communication, or by termination at the caller end after voice communication, after recording a voice-mail message or when the call is not answered (step 140). The portable electronic device 22 maintains a record of the phone call received. The record includes information such as the type of call (incoming), whether or not the call was completed or missed, the name and phone number of the originator of the call, the time at which the call was received and the elapsed time of the call when the call was terminated. Again this information is stored in the database on the persistent storage device 46 of the portable electronic device 22 (step 142). With this information change (addition) to the database on the persistent storage device 46, the call information from the call record is then sent to the communication system 20 via a radio communication channel (step 144).

The call record is received at the base station 24 (step 146) and forwarded through the wireless network and infrastructure 28 to the relay 30 and server 32 (step 148). The server 32 receives the call record and extracts the information for addition to a phone log file in the persistent storage 72 of the server 32. In the present example, the server 32 extracts log information from the record, including the identification of the originator of the call (name and phone number), the type of call, the name and phone number of the person called, the time at which the call was initiated and the elapsed time of the call. The server 32 also adds log information including a server log date, indicating the date and time the phone record is logged on the server 32, and a unique identification for the phone log record. The phone log file associated with the portable electronic device 22 is retrieved from the persistent storage 72 (step 150). The phone log information is then added to the phone log (step 152) and the modified (or new) phone log file is stored in the persistent storage 72 (step 154). In addition to storing the log, a copy of the phone record is forwarded to the connector 36 and stored in the backup/restore database 38 (step 156).

It will be appreciated that the log information is stored on a database at the communication system 20, thereby maintaining logs useful for auditing wireless communications sent and received.

It will be appreciated that the components of the portable electronic device are shown in FIG. 2 for exemplary purposes only. Other portable electronic device components are possible. For example, rather than a trackwheel 49, as shown in FIG. 2 and referred to in the above description, the portable electronic device 22 can include a trackball. The trackball can be depressed as a means to provide additional user-input. The microprocessor 40 receives input from the trackball which is used for user selection of features from a list or a table on the LCD display 50 of the portable electronic device 22. Selection is carried out by rolling the trackball to roll a cursor (or highlighted region), for example, to the desired selection and pressing inwardly on the trackball. The portable electronic device 22 also includes other features, such as a battery, that are not shown.

According to one aspect of the present application, there is provided a method for maintaining a log of communications initiated and received at a portable electronic device of a first party. The communication includes at least one of short message service (SMS) message, personal identification number (PIN) message and cellular telephone communication. The method includes receiving a data record of the communication initiated from the device, extracting information from the data record, and storing the information in a log file.

According to another aspect, there is provided a system for maintaining a log of communications initiated and received at an electronic device of a first party. The communications include at least one of short message service (SMS) messages, personal identification number (PIN) messages and cellular telephone calls. The system includes a receiver for receiving a data record for each one of said communications, a processor for extracting information from said data record, and a memory device for storage of said information in a log file.

According to another aspect, there is provided a computer-readable medium having computer readable code embodied therein for receiving a data record of a communication initiated or received at a portable electronic device of a first party. The communication includes one of a short message service (SMS) message, a personal identification number (PIN) message and a cellular telephone call, extracting information from said data record, and storing said information in a log file.

Advantageously, a log of each type of wireless communication sent and received is maintained automatically by extracting information from the message or telephone call. These logs are useful for auditing wireless communications sent and received.

While the embodiments described herein are directed to particular implementations of the system and method for communication record logging, it will be understood that modifications and variations to these embodiments are within the scope and sphere of the present application. For example, the log files described and created at the server 30 can be administrator enabled or disabled as desirable by changing settings at the administration server 34. Also, the log files are described as being stored in the persistent storage 72 of the server 32. It will be understood, however, that the log files can be stored in any suitable default location or otherwise defined location.

Many other modifications and variations may occur to those skilled in the art. All such modifications and variations are believed to be within the sphere and scope of the present application.

What is claimed is:

1. A method for maintaining a log of communications initiated and received at an electronic device of a first party, said electronic device in communication with a server, the communications including at least one of short message service (SMS) messages and personal identification number (PIN) messages, the method comprising:
receiving, at said server, said communications, said communications at least one of:
sent by said electronic device, forwarded to said server, and then routed to a destination electronic device; and
sent from a second electronic device, forwarded to said server and then routed to said electronic device;
extracting, at said server, information from said communications; and
either
creating, at said server, a new log file if an appropriate log file does not exist;
adding said information extracted from said communications to said new log file; and
storing said new log file in a memory associated with said server; or
retrieving, at said server, a previously created log file from said memory;
adding said information extracted from said data record to said previously created log file to create an updated log file; and
storing said updated log file in said memory; and
receiving, at said server, a call record of a telephone call, from said electronic device;
extracting, at said server, information from said call record; and
storing said information from said call record in said updated log file, such that said server combines said information from said communications and said information from said call record in said updated log file.

2. The method according to claim 1, wherein extracting information from said communications comprises extracting a time of a respective one of said communications and extracting identification information relating to a second party involved in said respective one of said communications.

3. The method according to claim 1, wherein extracting information from said communications comprises extracting a time of the message, a body of the message, and information relating to a second party involved in said message.

4. The method according to claim 1, wherein extracting information from said call record comprises extracting an identification of a second party involved in said telephone call, a time of said call and an elapsed time of said call.

5. The method according to claim 1, wherein separate log files are created and maintained for each communication type for which log information is stored.

6. The method according to claim 5, wherein separate log files are created and maintained for each date of communications for which log information is stored.

7. The method according to claim 1, wherein separate log files are created and maintained for each date of communications for which log information is stored.

8. A system for maintaining a log of communications initiated and received at an electronic device of a first party, the communications including at least one of short message service (SMS) messages and personal identification number (PIN) messages, the system comprising:
  a memory device for storage of information in a log file; and
  a server in communication with said electronic device, said server comprising:
    a receiver for receiving said communications, said communication at least one of:
      sent by said electronic device, forwarded to said server (32), and then routed to a destination electronic device; and
      sent from a second electronic device, forwarded to said server and then routed to said electronic device;
    a processor for extracting information from said communications, and
    either
      creating a new log file if an appropriate log file does not exist;
      adding said information extracted from said communications to said new log file; and
      storing said new log file on said memory device, or
      retrieving a previously created log file from said memory device; adding said information extracted from said data record to said log file to create an updated log file; and
      storing said updated log file on said memory device; and
  wherein said server is further configured for:
  receiving a call record of a telephone call, from said electronic device;
  extracting information from said call record; and
    storing said information from said call record in said updated log file in said memory device, such that said server combines said information from said communications and said information from said call record in said updated log file.

9. The system according to claim 8, wherein said processor extracts a time of a respective one of said communications and extracts identification information relating to a second party involved in said respective one of said communications.

10. The system according to claim 8 wherein said processor extracts a time of the message, a body of the message, and information relating to a second party involved in said message from said communications.

11. The system according to claim 8, wherein said processor extracts an identification of a second party involved in said telephone call, a time of said call and an elapsed time of said call from said call record.

12. The system according to claim 8, wherein separate log files are created and maintained on said memory device for each communication type for which log information is stored.

13. The system according to claim 12, wherein separate log files are created and maintained on said memory device for each date of said communications for which log information is stored.

14. The system according to claim 8, wherein separate log files are created and maintained on said memory device for each date of said communications for which log information is stored.

15. A non-transitory computer-readable storage medium having computer-readable code embodied therein for:
  receiving, at a server, a communication initiated or received at an electronic device of a first party, the communication comprising one of a short message service (SMS) message, and a personal identification number (PIN) message, said communication at least one of:
    sent by said electronic device, forwarded to said server, and then routed to a destination electronic device; and
    sent from a second electronic device, forwarded to said server and then routed to said electronic device;
  extracting, at said server information from said communication; and
  either
    creating, at said server, a new log file if an appropriate log file does not exist;
    adding said information extracted from said communication to said new log file; and
    storing, at said server, said new log file in a memory associated with said server or
    retrieving, at said server, a previously created log file from said memory;
    adding said information extracted from said data record to said previously created log file to create an updated log file; and
  storing said updated log file in said memory; and
  receiving a call record of a telephone call, from said electronic device;
  extracting information from said call record; and
  storing said information from said call record in said updated log file in said memory device, such that said server combines said information from said communications and said information from said call record in said updated log file.

* * * * *